A. P. ANDERSEN.
INDICATOR.
APPLICATION FILED OCT. 7, 1912.
1,064,954.
Patented June 17, 1913.
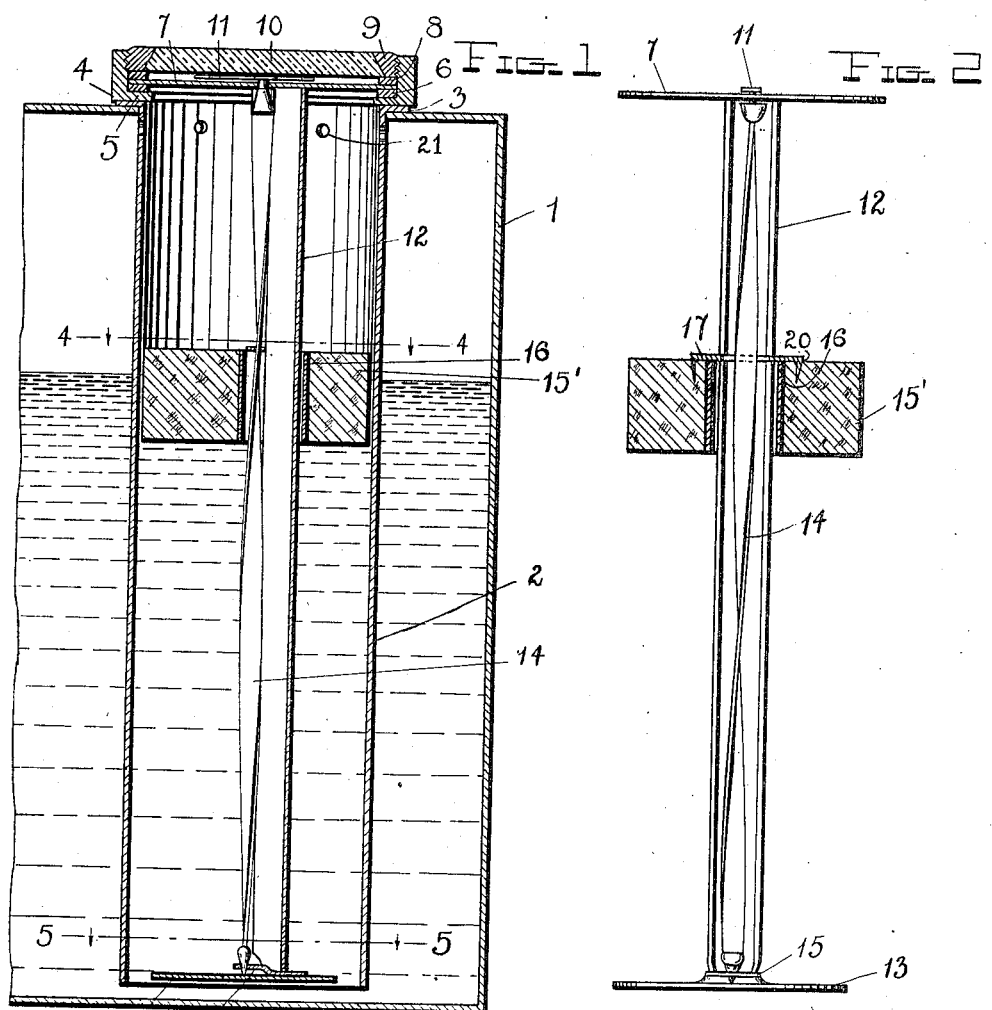
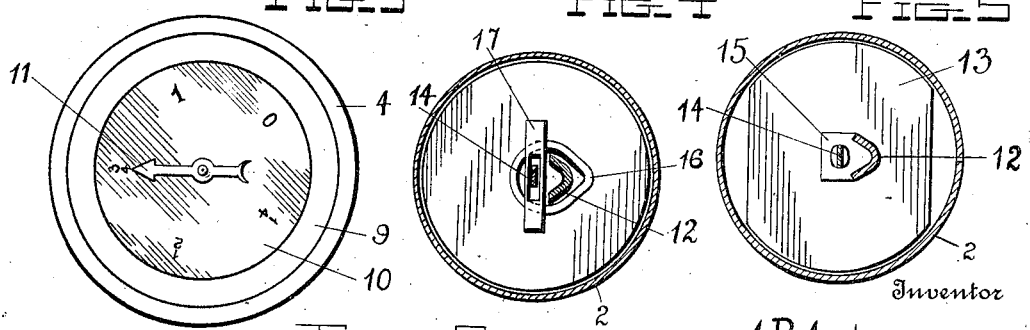
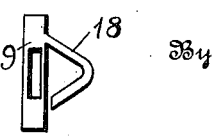
Witnesses
E. D. Haines.
Inventor
A. P. Andersen.
By H. B. Willson &co
Attorneys

UNITED STATES PATENT OFFICE.

ANDER PETER ANDERSEN, OF AKRON, OHIO.

INDICATOR.

1,064,954.

Specification of Letters Patent. Patented June 17, 1913.

Application filed October 7, 1912. Serial No. 724,473.

*To all whom it may concern:*

Be it known that I, ANDER PETER ANDERSEN, a subject of the King of Denmark, residing at Akron, in the county of Summit and State of Ohio, have invented certain new and useful Improvements in Indicators; and I do declare the following to be a full, clear, and exact description of the invention, such as will enable others skilled in the art to which it appertains to make and use the same.

This invention relates to indicators and is more especially adapted to be attached to and form a part of a fluid containing tank of conventional design.

The primary object of the invention is in the provision of an apparatus of the character described, whereby the amount of the fluid contained within the tank or other receptacle is conspicuously and accurately indicated.

A further object of the invention is in the particular construction and arrangement of parts whereby the same are rendered sensitive and capable of being accurately operated by the various elevations of the fluid in the tank.

With these and other objects in view, the invention consists of certain novel features of construction, and the combination and arrangement of parts as will be more fully described and claimed.

In the accompanying drawings: Figure 1 is a vertical longitudinal section of the complete invention showing the same attached to a tank; Fig. 2 is a side elevation of the operating mechanism of the device, the float thereof and guides carried thereby being in section; Fig. 3 is a top plan view of the indicator; Fig. 4 is a cross section taken on the line 4—4 of Fig. 1; Fig. 5 is a similar section taken on the line 5—5 of Fig. 1; Fig. 6 is a plan view of a modification of the metallic guide which is carried by the float.

In the illustrated embodiment of the invention 1 represents a tank of any well known construction and capable of containing a suitable fluid such as gasolene or other similar liquid.

The invention consists of a cylinder 2 which may be rigidly secured to or detachably fixed to the top of the tank and depends therefrom, the lower open end of which is positioned a suitable distance from the bottom of the tank, whereby the gasolene or other liquid may freely enter the cylinder. The upper end of the cylinder is provided with an annular flange 3 which is in binding contact with the top of the tank and hermetically sealed thereto, and rigidly attached to said flange is an internally screw threaded collar 4 which forms the projecting and exposed end of the cylinder or indicator above the top of the tank. The collar 4 is provided with an annular flange 5 forming the seat for a gasket 6, and disposed upon the latter is a dial plate 7 which is sealed and properly secured by a gasket 8 and externally screw threaded ring 9 which is brought in contact with the gasket 8 whereby the dial is held in a sealed and rigid position. The detachable ring 9 not only bindingly holds the dial in a rigid position but it also secures in position a glass or lens 10 which covers the dial and upper gasket 8 providing a suitable space between said lens and dial for the free movement or rotation of a pointer 11 which co-operates with suitable graduations properly numbered or other identifying characters, whereby the amount of liquid contained within the tank can be readily ascertained.

To the dial plate 7 and depending therefrom is secured a guide post or rod 12 which is substantially V-shaped in cross section and to the lower end of said rod is rigidly secured a plate 13 the opposite sides of which conform to the inner surface of the cylinder 2 but is sufficiently cut away or reduced as shown in Fig. 5 to permit the free passage of the fluid into said cylinder.

In order to carry out the practical operation of the apparatus a shaft 14 is provided which consists of a strip of flexible metal or other suitable material twisted along its entire length and having its lower end removably mounted in an outstanding lug 15 located adjacent to the plate 13, the upper end of said shaft loosely passing through the indicating dial 7 and to which is secured the pointer 11 for the purpose previously described. The float 15′ is composed of suitable material and well adapted for the purpose, the same being of a sufficient size to freely move within the cylinder 2 and capable of being operated by the height of liquid contained within the tank 2. The float 15′ which is slidably mounted upon the rod 12 is provided with an opening in which is fixed a frictional collar 16 which loosely embraces said rod and conforms substantially to the shape of the latter, and secured to the upper surface of the float is a plate 17 having an elongated opening formed therein through which the shaft 14 freely passes, said shaft and slot being so proportioned as to cause the latter to be turned during the movement of the float. In Fig. 6 a slight modification is shown whereby the metallic guide plate for the shaft and the guide rod is formed of a single piece of metal with a yielding extension 18 projecting from one side of the plate 19 through which the shaft passes and having its opposite free end out of contact with the plate, whereby when the proper opening is formed in the float and the plate thus constructed is forced into said opening, the same will be held in a rigid and operative position with respect to the rod and shaft in parallel relation thereto. As shown in Fig. 2 the plate 17 which engages with the shaft 14 is secured in position by attaching lugs 20 which form an integral part thereof and are bent downwardly and forced into the material of which the float is composed. As clearly shown the spiral shaft thus constructed is flexible throughout its entire length and therefore rendered very sensitive under the action of the various heights of the liquid contained in the tank, and further it is to be noted in this connection that said shaft is embraced by the V-shaped rod 14 along its entire length and partially housed thereby, whereby the float is centrally positioned within the chamber 2 and further any foreign accumulation or sediment that might adhere to the shaft will be removed therefrom during the operation of said shaft by the outer exposed edges of the rod. By the particular formation of the collar in the guide post with which it engages the float 15' is prevented from rotating when the same is raised and lowered by the fluid contained within the tank or receptacle 1. It is further to be noted that the lower end of the flexible shaft 14 can be readily detached whereby the same can be removed from the V-shaped guide rod 14 for cleaning either the rod or the shaft which is very essential in devices of this character in order that the pointer may accurately indicate the various heights of the liquid contained within the tank.

The upper portion of the cylinder 2 is provided with a plurality of openings 21 located immediately below the top of the tank 1, whereby the float is not retarded in its action by the action of air or liquid contained within the receptacle.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus described my invention, what I claim is:

1. An indicator for liquid containing tanks comprising a cylinder removably attached to said tank, an indicating dial secured to the upper portion of said cylinder and exposed to view, a guide post secured to the dial and depending therefrom, a plate secured to the lower end of said post, an outstanding lug secured to the plate and provided with an opening, a shaft composed of a strip of flexible material and twisted along its entire length and arranged adjacent to the post, the latter being substantially V-shaped in cross section, a float slidably mounted upon the post within the cylinder and prevented from rotating by the same upon which it moves, a guide plate having an elongated opening formed therein for engagement with the shaft, the lower end of the latter being rotatably mounted in the opening formed in the outstanding lug, and means forming a part of said plate for securing the same rigidly to the float.

2. In combination with a device of the character described, a plate having an elongated opening formed therein, a float having an opening formed therein, an extension forming an integral part of said plate with its free end normally out of contact with the plate, whereby the plate together with its extension is adapted to be forced into a correspondingly shaped opening in the float and the plate held therein by frictional engagement, the elongated opening in the plate being adapted to engage a shaft for rotating the same and with the extension of the plate embracing the shaft of the device, whereby the float is prevented from rotating when the shaft is operated.

In testimony whereof I have hereunto set my hand in presence of two subscribing witnesses.

ANDER PETER ANDERSEN.

Witnesses:
PETER NELSON,
TONY ANDERSON.